July 30, 1929.  O. MESSTER  1,722,935

TARGET PRACTICE APPARATUS

Filed Dec. 19, 1927

O. Messter
INVENTOR

By: Marks & Clark
ATTYS.

Patented July 30, 1929.

1,722,935

UNITED STATES PATENT OFFICE.

OSKAR MESSTER, OF BERLIN, GERMANY.

TARGET-PRACTICE APPARATUS.

Application filed December 19, 1927, Serial No. 241,211, and in Germany September 3, 1927.

This invention relates to target-practice apparatus in the form of a gun camera, particularly intended for use in aircraft manœuvres.

An object of the invention is to provide apparatus of this character such that at each operation of a control corresponding to the firing of a shot, a pair of photographs is taken representing respectively the object sighted and the time.

Another object is to provide a gun camera wherein, at each operation of the trigger, an object picture and a surrounding clock picture are simultaneously registered upon the same photographic film which is then moved one step forward and retained until the trigger is again operated.

Still another object is the provision of a gun camera incorporating a clock, optical means for simultaneously photographing the clock and the sighted object upon a single film, and mechanism operatively connecting the gun trigger with shutters for the optical means and with a winding-off drum for the film in such manner that each pull of the trigger permits only one photographic exposure and automatically advances the film one step or picture section.

Figure 1:
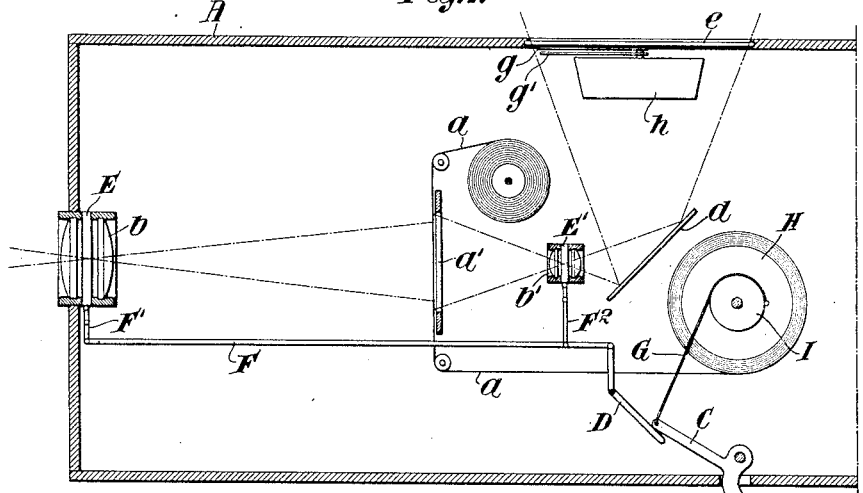
Figure 2:
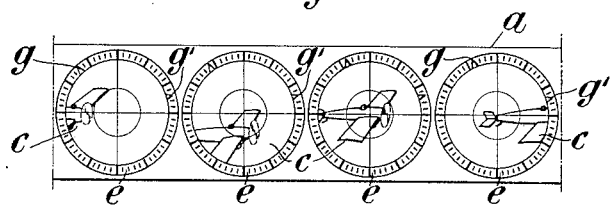
Figure 1A:
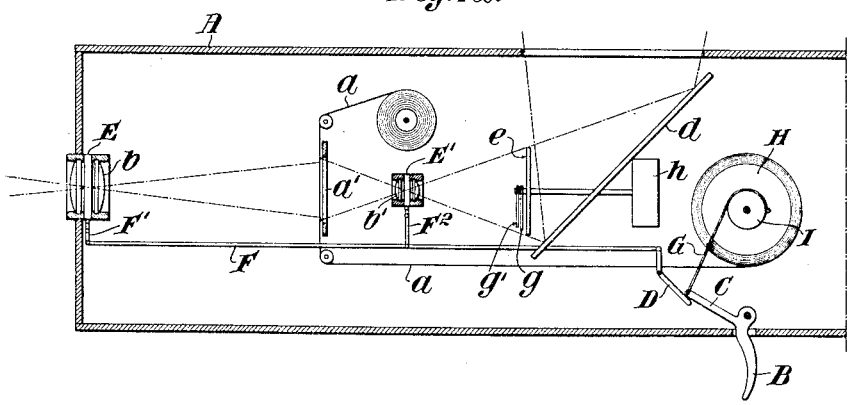

The invention is illustrated diagrammatically and by way of example on the accompanying drawing on which Fig. 1 is a fragmentary longitudinal section of the apparatus, parts being shown in side elevation, Fig. 1$^a$ a similar view of a modification, and Fig. 2 a front view of a portion of a film after photographic exposure in the apparatus.

As illustrated, the housing A of the apparatus is constructed like the forward part of a machine gun. It has at its forward end an objective $b$ whereby the image of the object sighted is adapted to be produced (counter to the aiming direction) on the film $a$, and it also has an objective $b^1$ and reflector $d$ whereby the image of the dial $e$ and hands $g:g^1$ of a clock $h$ is adapted to be produced (in the aiming direction) on the film, the aforesaid images appearing as shown in Fig. 2.

In this respect the apparatus is similar to that set forth in the specification of my pending application Serial No. 198,363 filed 13th June, 1927, but whereas according to said specification series of pairs of photographs representing the sighted object and time are taken kinematographically at the same rate as shots are fired from a machine gun, my present apparatus is provided with means hereinafter fully described whereby only one pair of such photographs is taken at each operation of a control trigger B representing the firing of a shot.

The photographic film $a$ is guided in the focal plane of the objective $b$ across the window $a^1$ and the exposed portion of the film is received on a suitably mounted winding-off drum H adapted to be given say one-third of a revolution for each pull of the trigger by reason of a band G attached to the arm C of the trigger and connected to a small drum I which is connected to the winding-off drum H through pawl-and-ratchet mechanism. The arrangement permits intermittent one-way rotation of the drum H corresponding to the height of one section of the film $a$ as well as independent return movement of the drum I whenever the trigger B is released.

The arm C of the trigger B is also adapted to press on a lever D connected to the shutters E:E$^1$ of the objectives $b:b^1$ by a rod F and levers F$^1$:F$^2$. By this means the trigger B when pulled back draws out the shutters E:E$^1$ to permit the required exposure of the film $a$. After such exposure the film is moved forward automatically a distance corresponding to one section only, this movement being effected by reason of the connection from the trigger to the winding-off drum.

It will be seen from Fig. 2 that the image of the target or object aimed at lies within the annular time image represented by the dial $e$ and hands $g:g^1$ and it will be understood that in order to obtain the four pairs of pictures shown on Fig. 2 four separate operations of the trigger B are required one for each pair.

In the modification of the apparatus shown in Fig. 1$^a$ the dial $e$ and hands $g:g^1$ are arranged directly behind the window $a^1$ while the clockwork $h$ is disposed behind the reflector $d$. In other respects this form of the invention is the same as that already described.

Having now fully described my invention, what I claim and desire to secure by Letters Patent is:—

1. Target-practice apparatus in the form of a gun camera having, in combination, a front objective to photograph the object sighted, a film carrier, means for guiding the film in the focal plane of said objective, a clock, means including another objective in rear of said film guiding means enabling the clock to be photographed simultaneously with the object sighted, a control adapted to be actuated to represent the firing of a shot, and means whereby only one pair of photographs of the sighted object and the clock is taken at each operation of the control.

2. Target-practice apparatus in the form of a gun camera having, in combination, a front objective to photograph the object sighted, a film carrier, means for guiding the film in the focal plane of said objective, a clock, means including another objective and a reflector arranged in rear of said film guiding means to enable the clock to be photographed simultaneously with the object sighted, a control adapted to be actuated to represent the firing of a shot, and means whereby only one pair of photographs of the sighted object and the clock is taken at each operation of the control.

3. Target-practice apparatus in the form of a gun camera having, in combination, a front objective to photograph the object sighted, a film carrier, means for guiding the film in the focal plane of said objective, winding-off means for the film, a clock, means including another objective in rear of the film guiding means for enabling the clock to be photographed simultaneously with the sighted object in such manner that the clock picture surrounds the object picture, a control trigger, shutters for the objectives, and mechanism operatively connecting the trigger with the shutters and with the film winding-off means whereby at each operation of the trigger the film is first exposed to take only one pair of photographs and is then moved forward one section.

4. Target-practice apparatus in the form of a gun camera having, in combination, a front objective to photograph the object sighted, a film carrier, means for guiding the film in the focal plane of said objective, winding-off means for the film, a clock, means including another objective in rear of the film guiding means for enabling the clock to be photographed simultaneously with the sighted object in such manner that the clock picture surrounds the object picture, a control trigger, shutters for the objectives, mechanism operatively connecting the trigger with the shutters to enable an exposure to be made at each operation of the trigger, and pawl-and-ratchet mechanism connecting the trigger with the winding-off drum so as to turn the drum to an extent corresponding to one photographic section of the film after such exposure.

In testimony whereof I affix my signature.

OSKAR MESSTER.